United States Patent [19]

Hara

[11] Patent Number: 5,508,904
[45] Date of Patent: Apr. 16, 1996

[54] SWITCHING REGULATOR HAVING SUPERIMPOSING CHOPPING-WAVE VOLTAGE FORMING CIRCUIT

[75] Inventor: Hirohito Hara, Osaka, Japan

[73] Assignee: Nihon Protector Co., Ltd., Suita, Japan

[21] Appl. No.: 356,006

[22] Filed: Dec. 14, 1994

[30] Foreign Application Priority Data

Dec. 17, 1993 [JP] Japan .................... 5-318649

[51] Int. Cl.$^6$ ............................ H02M 3/335; H02M 3/24
[52] U.S. Cl. ................................. 363/21; 363/97
[58] Field of Search ................... 363/16, 20, 21, 363/78, 95, 97, 131; 323/282, 285

[56] References Cited

U.S. PATENT DOCUMENTS

| | | | |
|---|---|---|---|
| 4,956,761 | 9/1990 | Higashi | 363/19 |
| 5,063,489 | 11/1991 | Inaba | 363/21 |
| 5,267,133 | 11/1993 | Motomura et al. | 363/21 |
| 5,297,014 | 3/1994 | Saito et al. | 363/21 |
| 5,408,402 | 4/1995 | Nonnenmacher | 363/21 |
| 5,414,611 | 5/1995 | Muto et al. | 363/21 |
| 5,440,473 | 8/1995 | Ishii et al. | 363/21 |

FOREIGN PATENT DOCUMENTS

98354   4/1992  Japan .
176762  7/1992  Japan .

*Primary Examiner*—Matthew V. Nguyen
*Attorney, Agent, or Firm*—Armstrong, Westerman, Hattori, McLeland & Naughton

[57] ABSTRACT

A switching regulator includes a primary-side circuit having a rectifier circuit without a smoothing circuit for applying a high-frequency pulse input voltage to a primary side of a high-frequency transformer, a secondary-side circuit including a rectifier circuit and a smoothing circuit at a secondary side of the high-frequency transformer, a superimposing chopping-wave voltage forming circuit for forming a chopping-wave voltage or a saw-tooth-wave voltage in synchronism with a pulse frequency of the primary-side circuit to superimpose a secondary-side d.c. output detecting voltage on the chopping-wave voltage or the saw-tooth-wave voltage, a control circuit which outputs a pulse signal when the chopping-wave voltage or the saw-tooth-wave voltage formed by the superimposing chopping-wave voltage forming circuit exceeds a reference voltage and lowers a clock pulse in level by use of a latch characteristic on the basis of the outputted pulse signal and hold the clock pulse till a rising of a succeeding clock pulse to output the clock pulse to the primary-side circuit as a switching pulse signal, and a step-up circuit having a bypass line and an inductor arranged in parallel to each other between the rectifier circuit and the high-frequency transformer in the primary-side circuit.

2 Claims, 9 Drawing Sheets

SWITCHING REGULATOR HAVING SUPERIMPOSING CHOPPING-WAVE VOLTAGE FORMING CIRCUIT

BACKGROUND OF THE INVENTION

1. Field of the Invention

The present invention relates to a switching regulator, and more particularly to a d.c. stabilizing power supply of a high-frequency switching system.

2. Description of the Related Art

Figure 10:
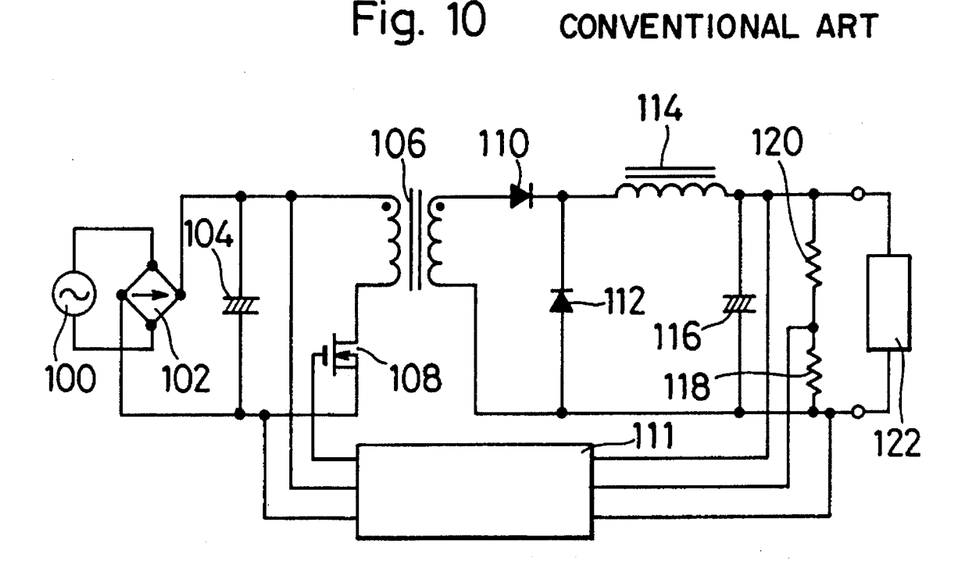
FIG. 10 is an exemplary circuit diagram showing a conventional switching regulator.

Hitherto, for obtaining a d.c. constant voltage from a commercial power supply, there have been used a variety of switching regulators. FIG. 10 shows a schematic circuit diagram of such a conventional switching regulator. An exemplary regulator shown in the figure includes at a primary side a main circuit which consists of an a.c. power supply 100, a full-wave rectifier 102, an input smoothing capacitor 104, a primary winding of a high-frequency transformer 106, and a high-frequency semiconductor switching element which is, for example, an FET 108 (a field effect transistor). A gate of the FET 108 is connected to a gate output terminal of a pulse width modulation (PWM) control circuit 111. At a secondary side, the regulator includes a main circuit which consists of a secondary winding of the high-frequency transformer 106, a rectifying diode 110, a commutating fly-wheel diode 112, a smoothing choke coil 114, and an output smoothing capacitor 116. An output terminal of the main circuit at the secondary side is connected to an output voltage detecting resistor 118 and a voltage dividing resistor 120 as well as a load circuit of a load 122. A divided voltage between the output voltage detecting resistor 118 and the voltage dividing resistor 120 is connected to one input terminal of the pulse width modulation control circuit 111.

Figure 11A:
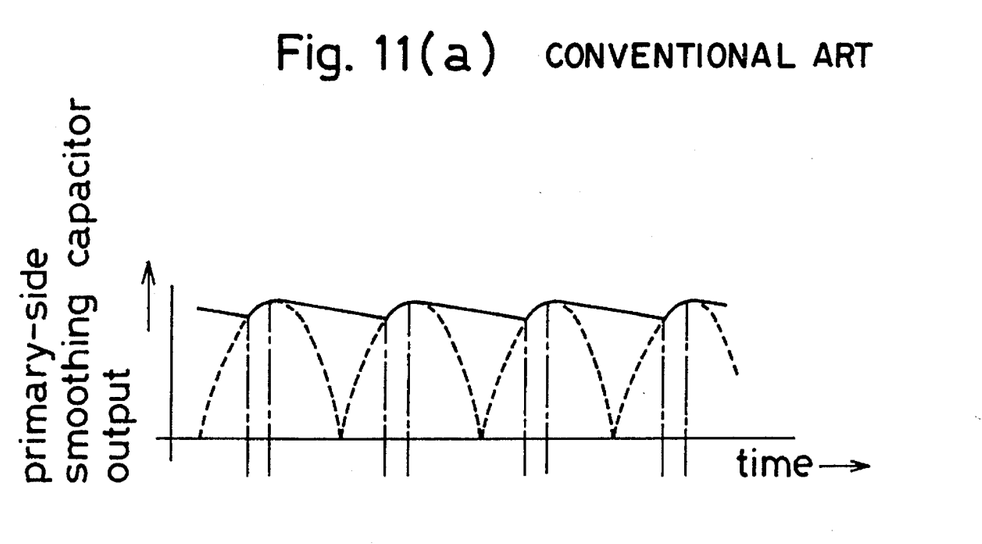
Figure 12:
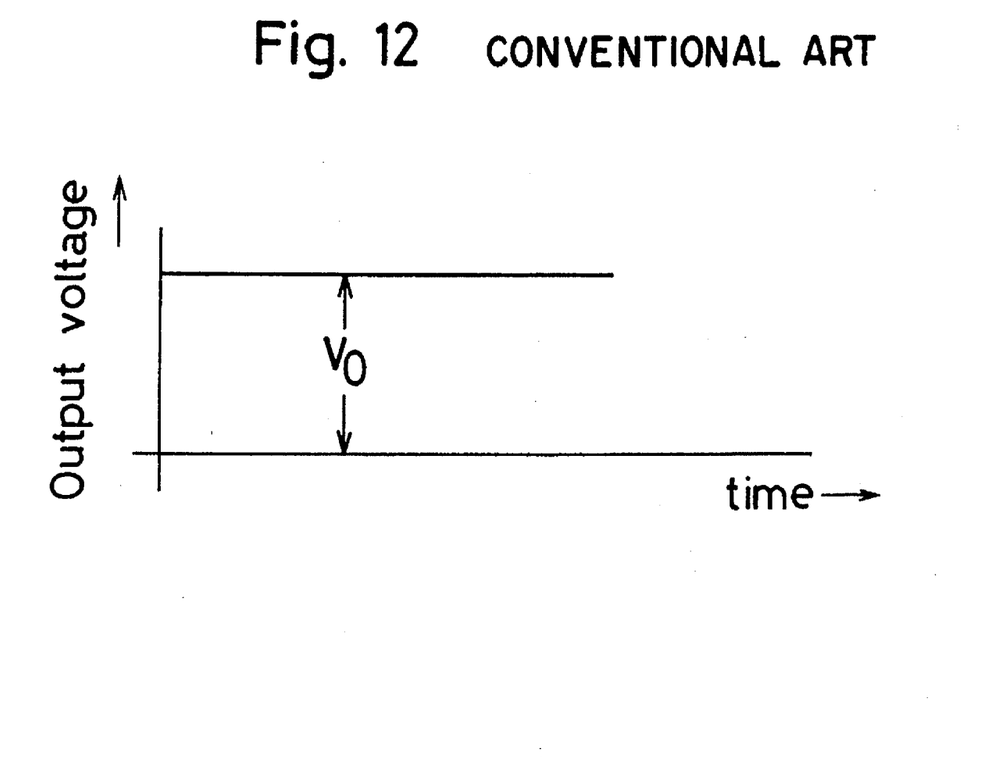
FIG. 12 is an output voltage waveform of the conventional switching regulator.

In the switching regulator of this type, the a.c. voltage supplied from the a.c. power supply 100 is full-wave rectified by the full-wave rectifier 102 and then smoothed by the input smoothing capacitor 104, thus causing a d.c. voltage containing a ripple component shown in FIG. 11(a) to be generated. The d.c. voltage is switched to a high-frequency pulse voltage by the FET 108, and transformed into a required voltage by the high-frequency transformer 106. The high-frequency pulse voltage thus transformed is smoothed through the rectifying diode 110, the commutating fly-wheel diode 112, the smoothing choke coil 114, and the output smoothing capacitor 116, resulting in a d.c. voltage shown in FIG. 12.

If the a.c. input voltage and a load are kept constant, then the pulse width of the high-frequency pulse voltage is constant so that a d.c. constant voltage $V_0$ is always applied to the load. However, since the output voltage $V_0$ is to be changed with fluctuation of the a.c. input voltage or load, the pulse width modulation control circuit 111 changes a signal to be outputted to the gate of the FET 108 in accordance with a voltage change $\Delta V$ detected from the divided voltage between the output voltage detecting resistor 118 and the voltage dividing resistor 120, so that the pulse width of the primary side high-frequency pulse voltage is so controlled as to maintain the output voltage $V_0$ constant.

Figure 11B:
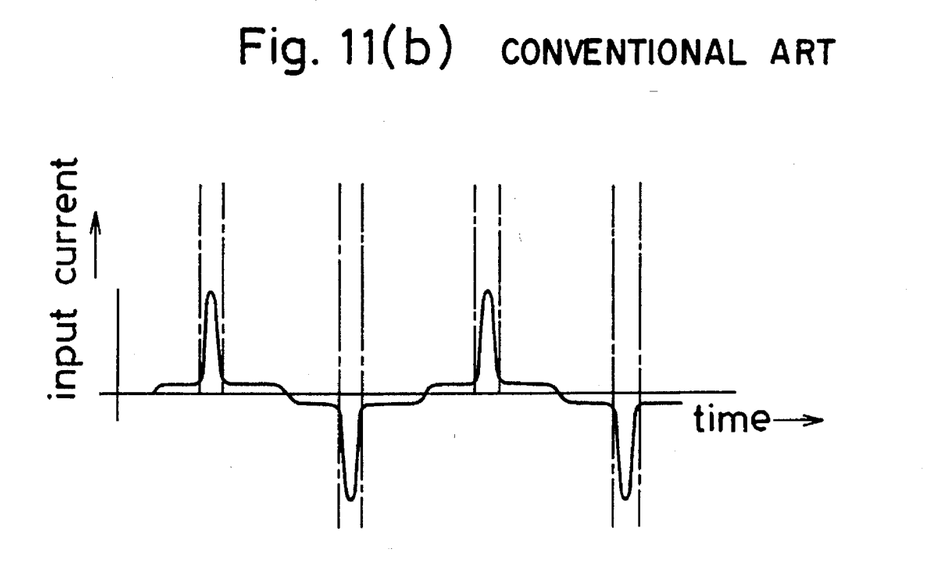

However, in the above-mentioned conventional switching regulator, the d.c. voltage containing the ripple components shown in FIG. 11(a) is applied across the input smoothing capacitor 104, and current is concentrated for charging of the ripple components. As a result, the a.c. input current becomes non-linear waveforms containing a lot of odd harmonics such as third and fifth ones as shown in FIG. 11(b). For that reason, the propagation of the switching regulators of this type causes recent problems such as high-frequency faults, for example, that the transformers at transforming stations in input distribution lines are heated or abnormal sounds are produced. Also, there arises a problem such that an increased amount of reactive current components flows due to leading power factor, resulting in an increase in wiring capacity. Moreover, since the primary-side input smoothing capacitor 104 smoothes the a.c. input voltage of a low frequency, the capacity is increased, the device is large-sized and the costs are increased. Such a conventional regulator has a limit of the power factor being 60 to 70% at maximum.

To solve the above problems, the inventor has proposed an improved switching regulator from which the primary-side smoothing capacitor 104 is omitted. The switching regulator is constituted so that the high-frequency pulse voltage which has been full-wave rectified is applied from the primary side to the secondary side and a d.c. voltage is generated by a smoothing circuit provided at the secondary side. The configuration is to improve the power factor with omission of the primary-side smoothing capacitor 104 shown in FIG. 10.

Figure 13:
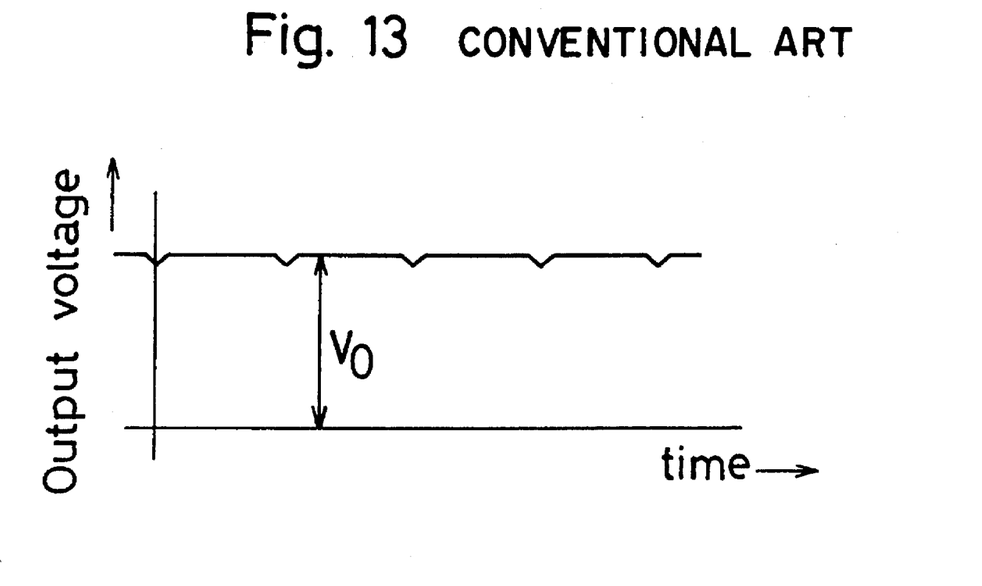
FIG. 13 is an output voltage waveform in the case where ripples occur in the conventional switching regulator.

However, even with such an improved regulator by the inventors, there yet remain the problems that the output smoothing capacitor 104 must be made as small as possible and also that the ripple components occur in the d.c. voltage at the output side as the capacitor 104 is made small. That is, in the case of a large load, as shown in FIG. 13, the ripple voltage appears in synchronism with a time at which the a.c. input voltage becomes 0 V. The ripple voltage cannot be reduced without increase of the capacity of the output smoothing capacitor, and even with such an improved regulator, the power factor is 85% at maximum.

SUMMARY OF THE INVENTION

The present invention has been made to solve the above problems with the conventional switching regulator, and therefore an object of the invention is to provide a switching regulator which is improved in power factor, downsized and inexpensive by raising a low voltage region of an input-side high-frequency voltage in a very simple manner to improve a charging efficiency for a secondary-side smoothing capacitor.

To attain the above object, the present invention has been achieved by the provision of a switching regulator which comprises: a primary-side circuit including a rectifier circuit without a smoothing circuit for applying a high-frequency pulse input voltage to a primary side of a high-frequency transformer; a secondary-side circuit including a rectifier circuit and a smoothing circuit at a secondary side of said high-frequency transformer; a superimposing chopping-wave voltage forming circuit for forming a chopping-wave voltage or a saw-tooth-wave voltage in synchronism with a pulse frequency of the primary-side circuit to superimpose a secondary-side d.c. output detecting voltage on the chopping-wave voltage or the saw-tooth-wave voltage; a control circuit which outputs a pulse signal when the chopping-wave voltage or the saw-tooth-wave voltage formed by the superimposing chopping-wave voltage forming circuit exceeds a reference voltage and lowers a clock pulse in level by use of a latch characteristic on the basis of the outputted pulse signal and hold the clock pulse till a rising of a succeeding clock pulse to output the clock pulse to the primary-side circuit as a switching pulse signal; a step-up circuit having a bypass line and an inductor arranged in parallel to each other between the rectifier circuit and the high-frequency transformer in the primary-side circuit; and a switching circuit for controlling a current flowing in the inductor in accordance with an input voltage waveform.

With the above construction, after an a.c. voltage inputted from an a.c. power supply to a primary side is full-wave rectified by the rectifier circuit, it is transformed into a sine-waveform high-frequency pulse voltage in a state of the sine full-wave waveform which are not subjected to smoothing process by switching operation. Then, the sine-waveform high-frequency pulse voltage is outputted to the secondary side and converted into a smoothing d.c. output voltage through the rectifier circuit and the smoothing circuit so as to be outputted to a load. On the other hand, as the sine-waveform high-frequency pulse voltage at the secondary side is raised, the superimposing chopping-wave voltage or the saw-tooth-wave voltage formed by the superimposing chopping-wave voltage forming circuit exceeds the reference voltage earlier. Therefore, since the pulse signal is outputted from a super-high-speed comparator at a higher speed, the level down of the clock pulse in the control circuit is at a high speed so that the pulse width of the switching pulse outputted to the switching element is shortened. Thus, as the sine-waveform high-frequency pulse voltage is raised, the pulse width is shortened into a reverse sine-waveform with the result that the d.c. output voltage is held constant.

Also, when the d.c. output voltage is changed with fluctuation of the a.c. input voltage or the load, a time at which the superimposing chopping-wave voltage exceeds the reference voltage is changed, thus changing a timing of outputting the pulse signal. As a result, the control circuit makes the level of the clock pulse down by use of the latch characteristic according to a change of the output pulse signal and outputs the clock pulse as the switching pulse signal to the switching element of the primary-side circuit. Hence, the switching pulse width for the switching element is changed, thereby maintaining the d.c. output voltage constant.

The most characterized action of the present invention is to include the step-up circuit and the switching circuit in the primary-side circuit. That is, the circuits judge a magnitude of the a.c. input voltage so as to allow current to flow through the bypass line in a high-voltage region and allow current having a predetermined frequency to flow to the inductor side through the switching circuit in the low-voltage region. With this operation, the voltage generated by self-induction of the inductor when the switch is conductive is superimposed on the high-frequency pulse voltage instantaneously when the switch is interrupted.

The above and other objects and features of the present invention will be more apparent from the following description taken in conjunction with the accompanying drawings.

BRIEF DESCRIPTION OF THE DRAWINGS

FIGS. 5(*a*) and 5(*b*) are explanatory diagrams showing a state where voltage is raised in accordance with the present invention;

FIG. 6(*a*) and 6(*b*) are explanatory diagrams showing a way in which a chopping-wave is generated;

FIGS. 11(*a*) and 11(*b*) are waveforms of voltage across a primary-side smoothing capacitor in the conventional switching regulator;

DETAILED DESCRIPTION OF THE PREFERRED EMBODIMENTS

Now, description will be given of an embodiment in accordance with the present invention with reference to the accompanying drawings.

Figure 1:
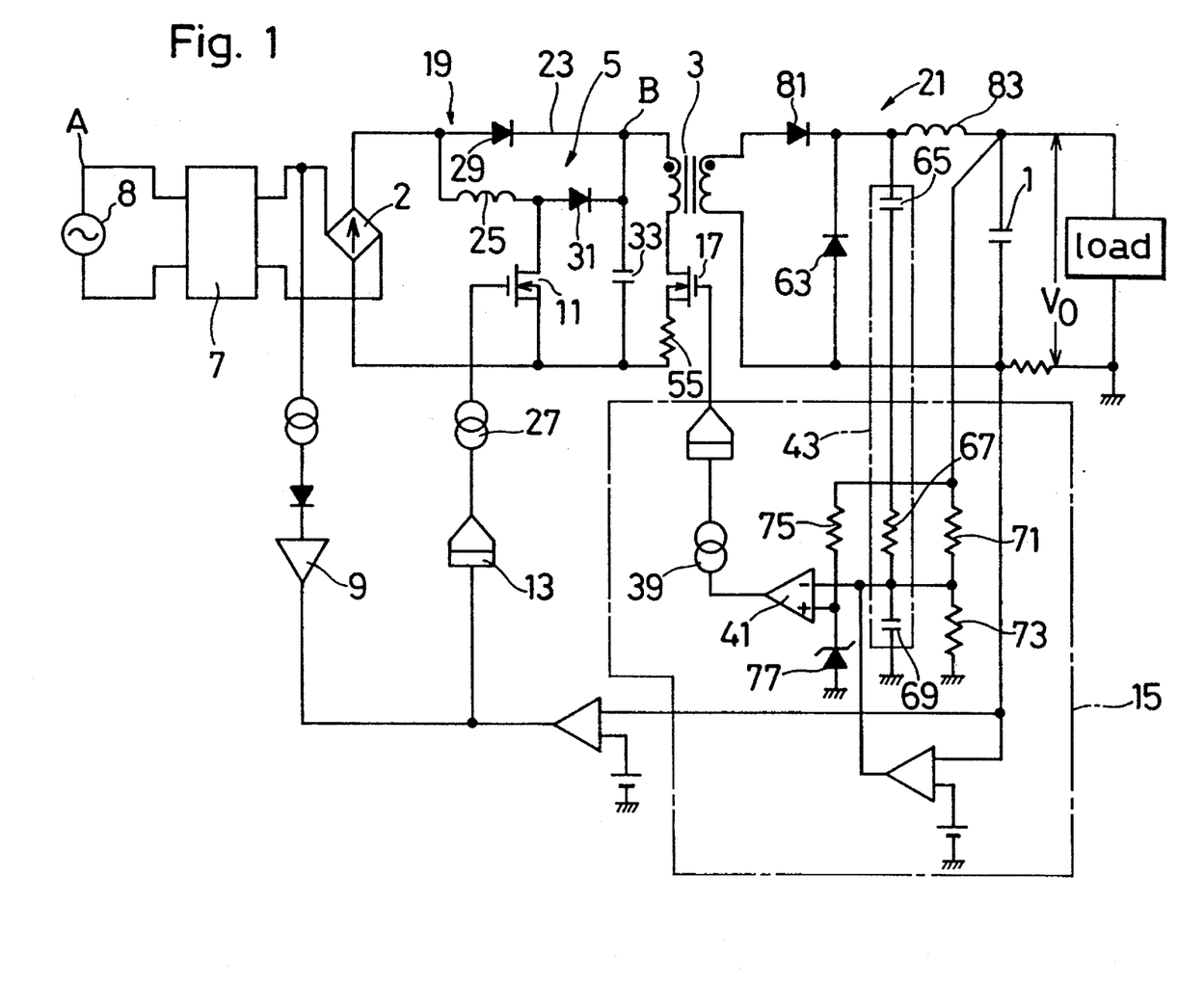
FIG. 1 is an exemplary circuit diagram showing a switching regulator in accordance with the present invention.
Figure 2:
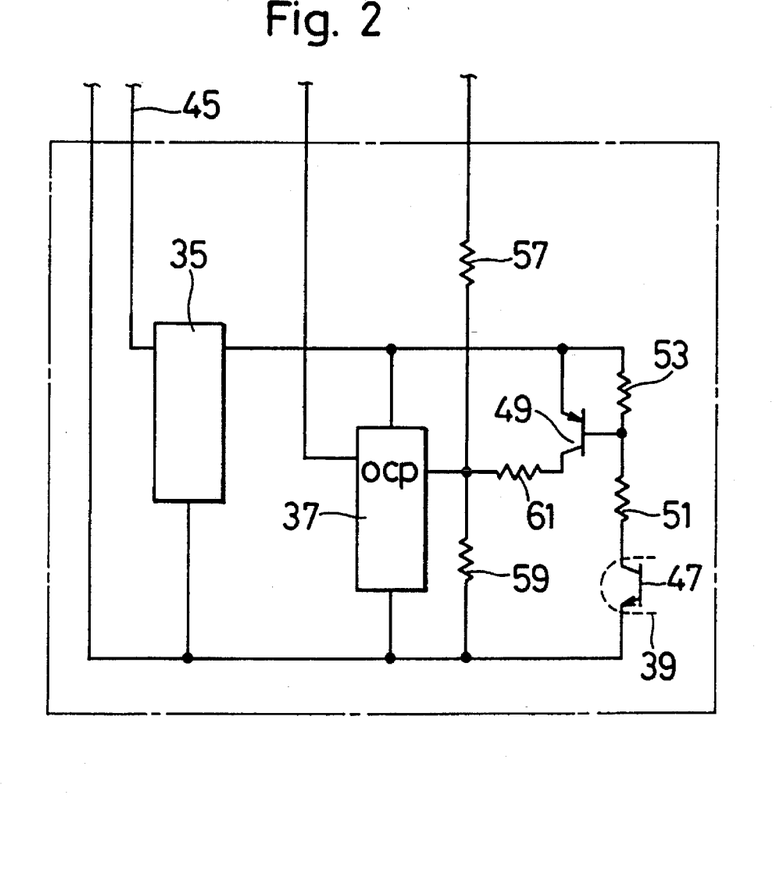
FIG. 2 is an exemplary circuit diagram showing a second pulse width modulating circuit in accordance with the present invention.

FIGS. 1 and 2 show a schematic circuit of switching regulator in accordance with the present invention. The circuit omits the input smoothing capacitor 104 of the conventional switching regulator circuit. The function of this omitted capacitor 104 is performed concurrently by an output smoothing capacitor 1. A step-up circuit 5 is provided between a rectifier circuit 2 and a high-frequency transformer 3 in a primary side, and a high-frequency line filter 7 is provided at the input side of the rectifier circuit 2. The circuit also includes a first pulse width modulation control circuit 13 for driving a first switching element 11 by a predetermined chopping frequency in synchronism with a signal from a voltage detecting means 9 for detecting an input a.c. voltage 8; a primary-side circuit 19 including a second switching element 17 which is actuated in accordance with a second pulse width modulation control circuit 15 to obtain a high-frequency pulse voltage; and a secondary-side circuit 21 likewise in that shown in FIG. 10.

The step-up circuit 5 consists of a bypass line 23 and an inductor 25, and the first switching element 11 allows a full-wave rectification signal outputted from the rectifier circuit 2 to flow directly to the bypass line 23 side in a region where an instantaneous value of input voltage is high, but to flow to the inductor 25 side in a region where the instantaneous value is low. The first switching element 11 is connected to the first pulse width modulation control circuit 13 through an insulation coupling means 27 such as a super-high-speed photo-coupler or a transformer. Reverse-current preventing diodes 29 and 31 are provided at the bypass line 23 side and the inductor 25 side, respectively. As will be described later, a film capacitor 33 is connected between the output side and the grounded side of the step-up circuit. This is because voltage at a point B is previously raised and when the first switching element 11 is turned on, electric power is prevented from being applied to the high-frequency transformer 3.

The second pulse width modulation control circuit 15, as shown also in FIG. 2, mainly includes an auxiliary voltage forming circuit 35 and a switching regulator IC 37 actuating as a control circuit. The circuit 15 is connected to a super-high-speed comparator 41 and a superimposing chopping-wave forming circuit 43 through a photo-coupler 39 actuating as the insulation coupling means. The auxiliary voltage forming circuit 35 forms constant voltage from the output of the full-wave rectifier 2 and supplies it as a control voltage to the switching regulator IC 37 through a line 45. The auxiliary voltage forming circuit 35 is connected in series to a photo-transistor 47 of the super-high-speed photo-coupler 39, a base current limiter resistor 51 of a transistor 49, which will be described later, and a bleeder resistor 53. In this embodiment, the super-high-speed photo-coupler 39 is used as an insulation coupling, however, a transformer or the like may be used instead. The switching regulator IC 37 preferably has a frequency of 20 kHz or more and is formed of a PWM control exclusive IC including an over-current detecting circuit or the like having a clock oscillating frequency and a latch characteristic, preferably a model M51996 made by Mitsubishi Electric Corporation. In the block circuit shown in the figure, for convenience of explanation, an oscillating CR circuit is omitted and assumed to be within the block of the IC 37. Also, with an external CR circuit being attached to the switching regulator IC 37, a switching frequency can be arbitrarily determined.

An over-current detecting resistor 55 is connected to a drain of the FET 17, and over-current detection voltage dividing resistors 57 and 59 are connected between a node between the over-current detecting resistor 55 and the drain terminal of the FET 17 and a grounded terminal of the switching regulator IC 37. A divided voltage between the over-current detection voltage dividing resistors 57 and 59 is inputted to an OCP terminal of the switching regulator IC 37 to thereby detect an over-current. A terminal Vcc of the switching regulator IC is connected to the grounded terminal through the transistor 49, a limit voltage dividing resistor 61 and the voltage dividing resistor 59. A divided voltage between the limit voltage dividing resistor 61 and the voltage dividing resistor 59 is inputted to the OCP terminal of the switching regulator IC 37. A base of the transistor 49 is connected to a node between the base current limit resistor 51 and the bleeder resistor 53.

The superimposing chopping-wave forming circuit 43 includes a d.c. component cut capacitor 65 connected to the output side of a commutating fly-wheel diode 63 and a CR integrating circuit consisting of a resistor 67 and a capacitor 69. A node between an output voltage detecting resistor 71 and a voltage dividing resistor 73 is connected to a node between the resistor 67 and the capacitor 69 as well as one input terminal of the super-high-speed comparator 41. The superimposing chopping-wave forming circuit 43 forms a chopping-wave voltage which is synchronous with the switching frequency of the secondary-side high-frequency voltage and superimposes the secondary-side d.c. output detecting voltage on the chopping-wave voltage to thereby input the superimposed voltage to one input terminal of the super-high-speed comparator 41. Hereinafter, the chopping-wave voltage on which the d.c. output detecting voltage is superimposed is designated as a superimposed chopping-wave voltage.

To a non-inverted input terminal of the super-high-speed comparator 41, there is inputted a reference voltage obtained from a resistor 75 and a reference voltage element (Zener diode) 77 which are connected to the output terminal of the secondary-side circuit, and at an output terminal thereof, the output voltage of the secondary-side circuit is applied to a light emitting diode of a photo-coupler 39. The output voltage of the super-high-speed comparator 41 is at an H (high) level when the superimposed chopping-wave voltage or the saw-tooth-wave voltage is lower than a reference voltage, and when the superimposed chopping-wave voltage or the saw-tooth-wave voltage exceeds the reference voltage, the output voltage of the super-high-speed comparator 41 is set to an L (low) level at a super high speed. The super-high-speed photo-coupler 39 consists of a primary-side photo-transistor and a secondary-side light emitting diode, and is used for the purpose of insulating the primary side circuit from the secondary side circuit. When a current flows into the light emitting diode, it emits light at a super high speed so that the photo-transistor is turned on. A purpose of using the super-high-speed comparator 41 and the super-high-speed photo-coupler 39 is to instantly process level-down of a clock pulse before a succeeding clock pulse rises.

The operation of the switching regulator thus constituted will be described below.

Figure 3:
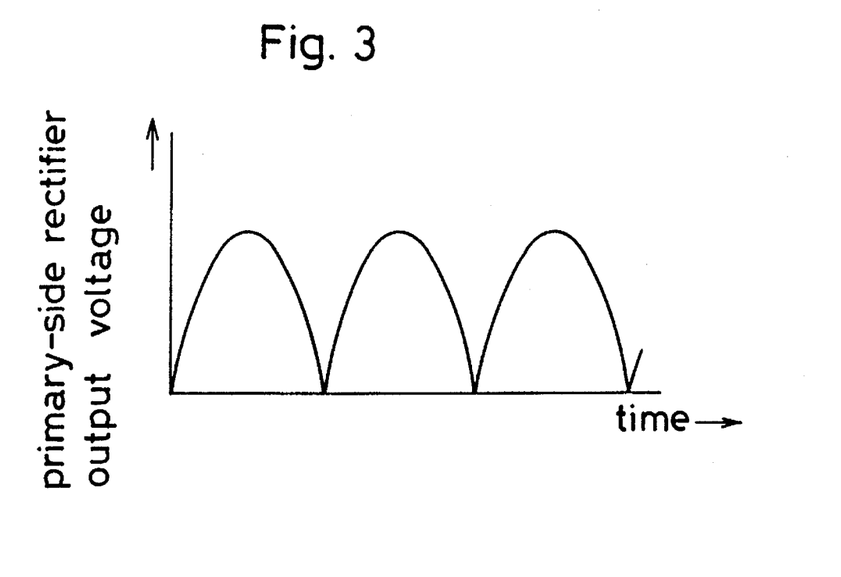
FIG. 3 is a full-wave rectification waveform rectified by a primary-side rectifier element.

The sine wave a.c. supplied from the a.c. power supply 8 is rectified into a sine-wave-shaped full-wave pulsating flow waveform shown in FIG. 3 by the full-wave rectifier 2 and supplied to the primary side of the high-frequency transformer 3. At this time, the a.c. input voltage is detected by the voltage detecting means 9, and if the input voltage is a constant reference voltage $V_A$ or less, the switching pulse signal of 40 kHz is applied to the gate terminal of the first switching element 11 (FET 11) by the first pulse width modulating control circuit 13.

Figure 4:
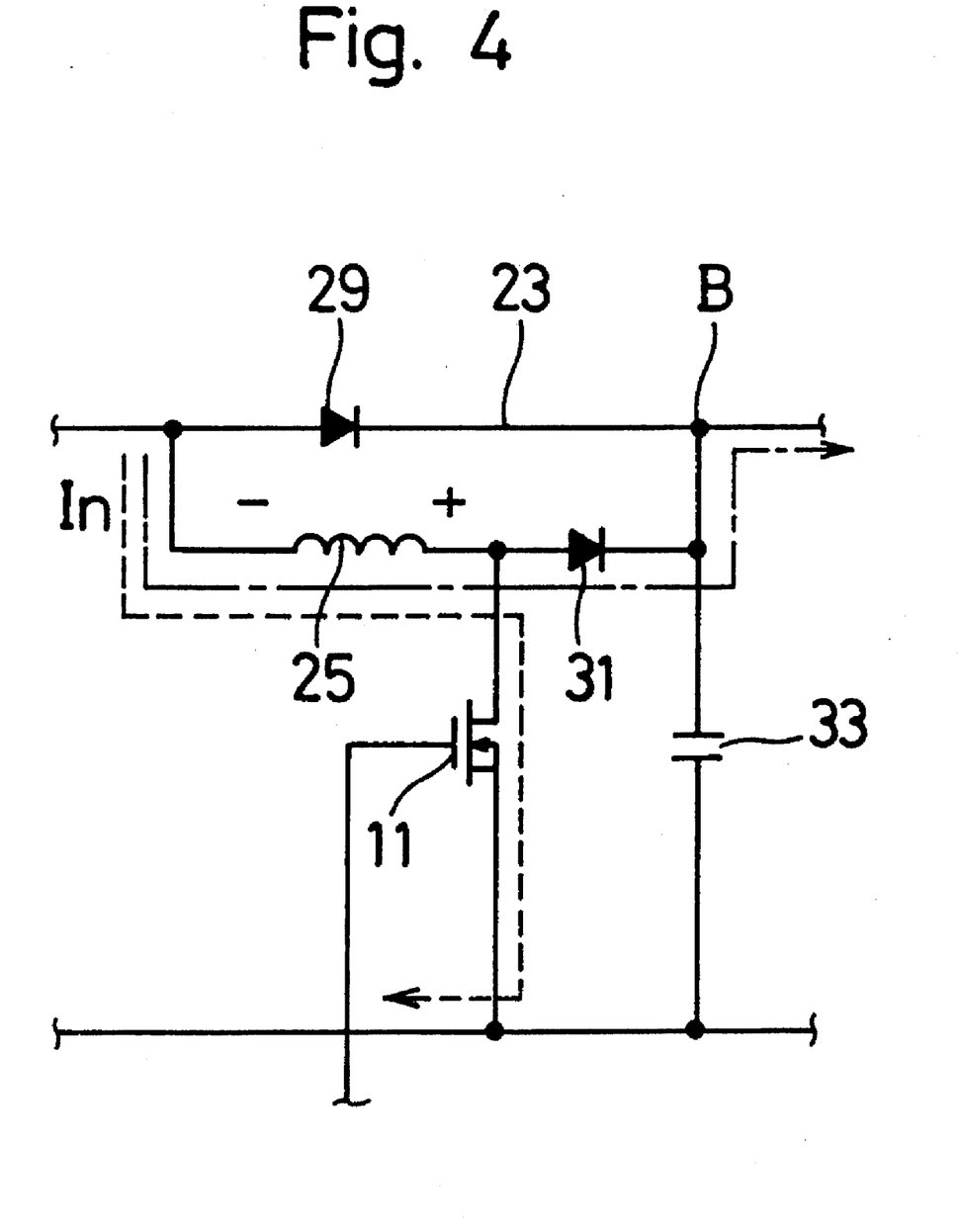
FIG. 4 is an explanatory diagram showing a current path of a step-up circuit in the present invention.

With such an operation of the FET 11, the current flows directly into the bypass path 23 from the a.c. input voltage 8 through the rectifier 2 in the region where the input voltage is the reference voltage $V_A$ or more. On the other hand, in the region where the input voltage is less than the reference voltage $V_A$, the current also flows into the inductor 25 as described above. As shown in FIG. 4, with the FET 11 being in the on-state in the region where the input voltage is less than the reference voltage $V_A$, the input current $I_n$ flows into a path indicated by a dotted line. This is because a voltage at the point B rises with the charges stored in the film capacitor 33. Then, a flyback voltage is generated across the inductor 25 at the time of the off-state by an electromagnetic energy stored in the inductor 25 at the time of the on-state as represented by plus and minus symbols in the figure as soon as the FET 11 is turned off. Hence, since the self-induction electromotive force is superimposed on the input voltage, all current in this case flows into the inductor 25 as indicated by a dashed line, and a voltage goes up in the low-voltage region as will be described below with reference to FIGS. 5(a) and 5(b).

Figure 5A:
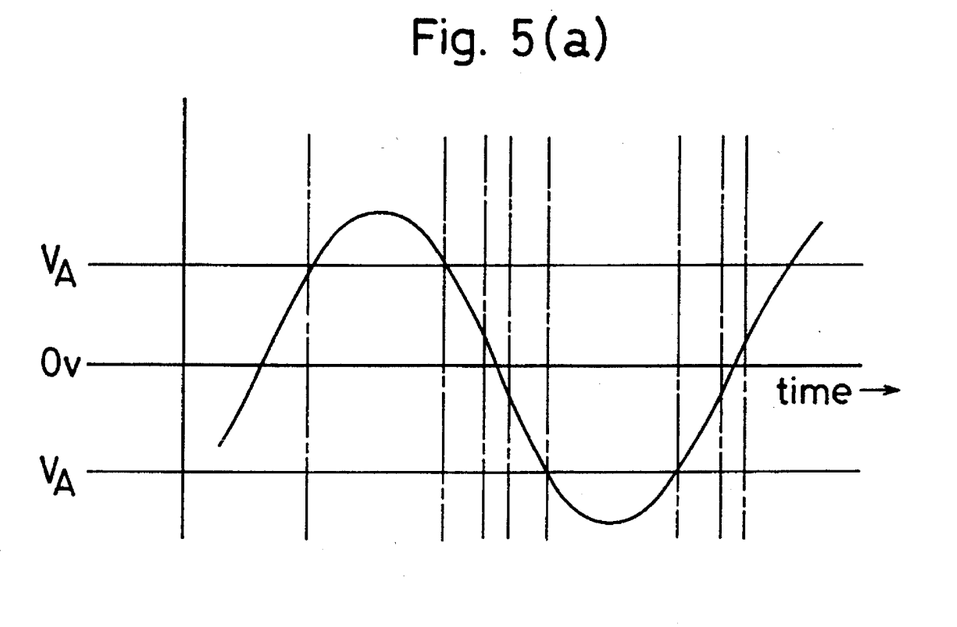
Figure 5B:
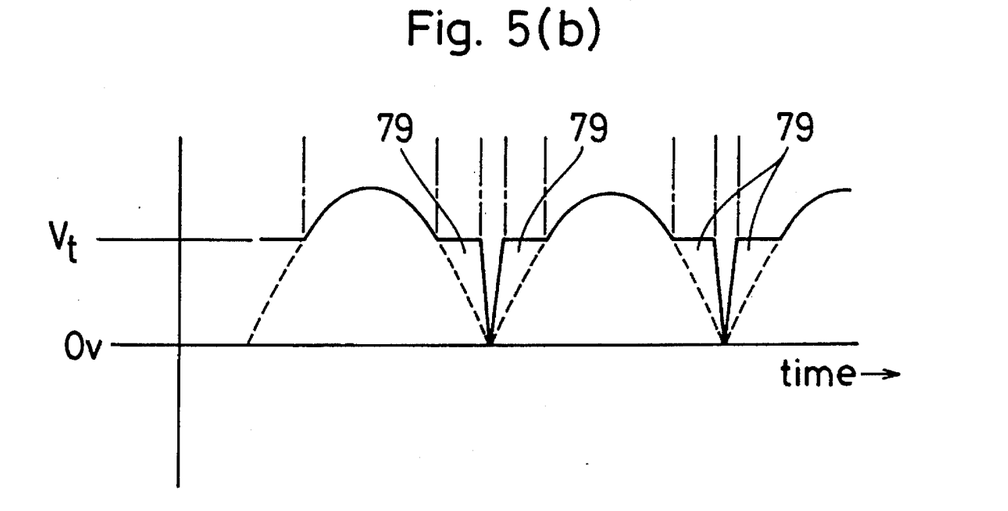

FIGS. 5(a) and 5(b) are representative of a change in a voltage waveform due to the above-mentioned step-up circuit, in which FIG. 5(a) is an a.c. input voltage waveform at the point A whereas FIG. 5(b) is a high-frequency pulse voltage waveform at the point B after being subjected to full-wave rectification. It goes without saying that FIG. 5(a) shows a sine wave of a portion where both shoulders 79 of peak voltage having a phase π/2 shown in FIG. 5(b) are raised. On the other hand, in the case of no step-up circuit as in the conventional switching regulator, as indicated by the dotted line in the figure, if voltage at both ends of the secondary-side smoothing capacitor 1, that is, the secondary-side output voltage $V_0$ is less than a threshold voltage $V_t$, the input voltage is lowered as indicated by the dotted line. The threshold voltage $V_t$ is represented by $$V_t = n_1/n_2 \cdot V_0 \tag{1}$$

where the numbers of turning of the high-frequency transformer at the first and second sides are $n_1$ and $n_2$, respectively. Therefore, if the reference voltage $V_A$ which allows the first switching element 11 to be operative is limited to the threshold voltage $V_t$ represented by expression (1), voltage at a low-input portion lower than $V_A$ is raised as indicated by a solid line in FIG. 5(*b*) with the result that the power factor is improved.

On the other hand, since the switching pulse signal of 100 kHz in this embodiment is applied to the gate of the FET 17 from the second pulse width modulation control circuit 15, the primary-side voltage as indicated by the solid line in FIG. 5(*b*) is switched (chopped) by the FET 17, resulting in a high-frequency carrier at the secondary side.

The primary-side high-frequency pulse voltage which has been switched by the FET 17 is transformed by the high-frequency transformer 3 and then outputted to the secondary side. The superimposed chopping-wave forming circuit 43 forms a chopping wave which is synchronous with the switching frequency and superimposed on the secondary-side output detecting voltage. As soon as the superimposed chopping-wave voltage exceeds the reference voltage, the super-high-speed comparator 41 outputs the L signal. Therefore, a current flows in the light emitting diode so that the photo-coupler 39 is turned on and also a current flows to the collector of the transistor 49 which is turned on. As a result, the divided voltage between the resistors 61 and 59 is inputted to the OCP terminal of the switching regulator IC 37 with priority to the over-current detecting voltage between the resistors 57 and 59. Then, the switching regulator IC 37 makes the clock pulse down in level by use of the latch characteristic. In this state, the succeeding clock pulse is outputted to the gate of the FET 17 as a switching pulse signal terminal.

Figure 6A:
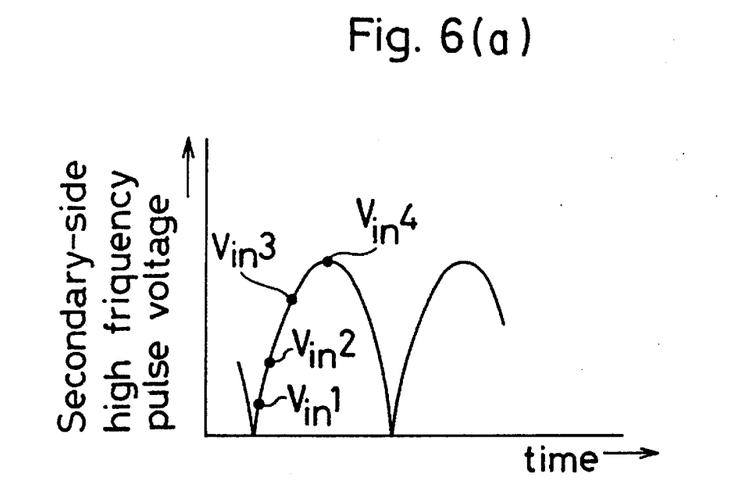
Figure 6B:
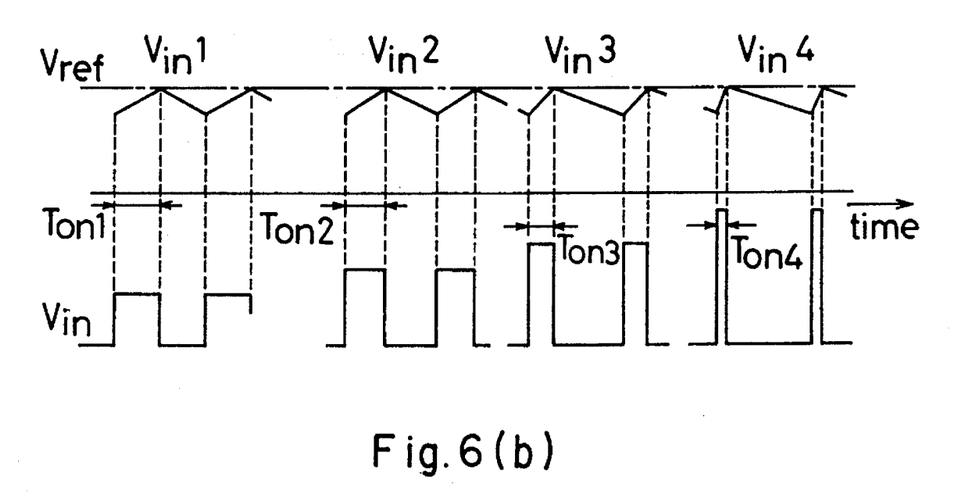
Figure 7:
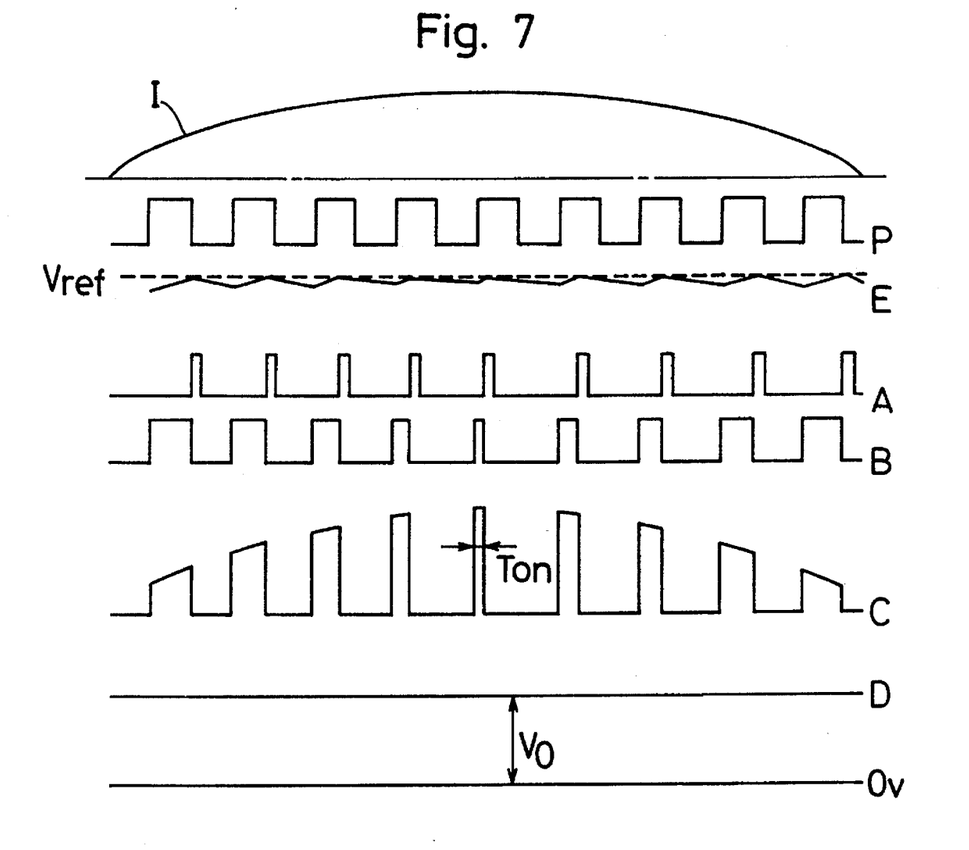
FIG. 7 is an explanatory diagram showing a state of a pulse width modulation control in the present invention.

By the way, as shown in FIGS. 6(*a*), 6(*b*) and 7, with the commercial a.c. input voltage being low (Vin$_1$), a time when the superimposed chopping-wave voltage from the superimposed chopping-wave forming circuit 43 exceeds the reference voltage (Vref) is late as is apparent from the CR characteristic. However, a time when the superimposed chopping-wave voltage exceeds the reference voltage is made earlier as the voltage is raised (Vin$_2$ to Vin$_4$). Hence, a timing when the super-high-speed comparator 41 outputs the L level, as shown in FIG. 7, is made earlier as a hypothetical secondary output voltage I corresponding to the a.c. input voltage 8 is raised, with which the OCP input pulse signal of the switching regulator IC 37 is made early. As a result, with the hypothetical secondary output voltage being raised, a time when the level of the clock pulse is made down in the switching regulator IC 37 gradually becomes early, as indicated by B in FIG. 7, so that the width of the switching pulse signal is shortened. The characters, E, P and I in FIG. 7 are representative of the superimposed chopping-wave voltage, the clock pulse and the a.c. input voltage.

In this way, since the switching pulse signal is modulated in width, the secondary-side high-frequency pulse voltage C is, as shown in FIG. 7 of the reverse sine waveform which is so shaped that Ton is long when the a.c. input voltage is low but is shortened as the a.c. input voltage approaches the peak voltage of the phase π/2. That is, the current flowing at the primary and secondary sides of the high-frequency transformer 3 is of a waveform analogous to that of the high-frequency pulse voltage as shown by C in FIG. 7.

The secondary-side high-frequency pulse voltage is again converted to d.c. voltage by a rectifying diode 81, then smoothed by the commutating fly-wheel diode 63, the smoothing choke coil 83 and the output smoothing capacitor 1 and outputted. The d.c. output voltage at this time is represented by the following expression (2)

$$V_0 = T_{on}/T \times Vin \qquad (2)$$

In this case, Ton is controlled to the reverse sine wave as mentioned above and Vin is a sine waveform, and therefore the output voltage $V_0$ is of a flat d.c. waveform as shown by D in FIG. 7.

As described above, if the a.c. input voltage and the load are constant, the drive pulse signal shown in FIG. 7 is outputted to the FET 17 by the second pulse width modulation control circuit 15 so that the FET 17 is switched, thereby obtaining a d.c. output voltage $V_0$ across the load. If the output voltage $V_0$ is to be raised by fluctuation of the a.c. input voltage or the load, the superimposed chopping-wave voltage formed by the superimposed chopping-wave forming circuit 43 is increased in accordance with its change. Therefore, a time when the superimposed chopping-wave voltage exceeds the reference voltage becomes early wholly, and the input pulse signal is inputted early to the OCP terminal of the switching regulator IC 37 so that the pulse width of the switching signal is shortened wholly. As a result, the pulse width of the secondary-side high-frequency pulse voltage is wholly shortened to thereby reduce Ton, and as is apparent from expression (2), the output voltage $V_0$ is lowered and maintained constant. Then, with such a construction, an extremely high power factor of 98% can be realized in comparison with the conventional one.

Figure 8:
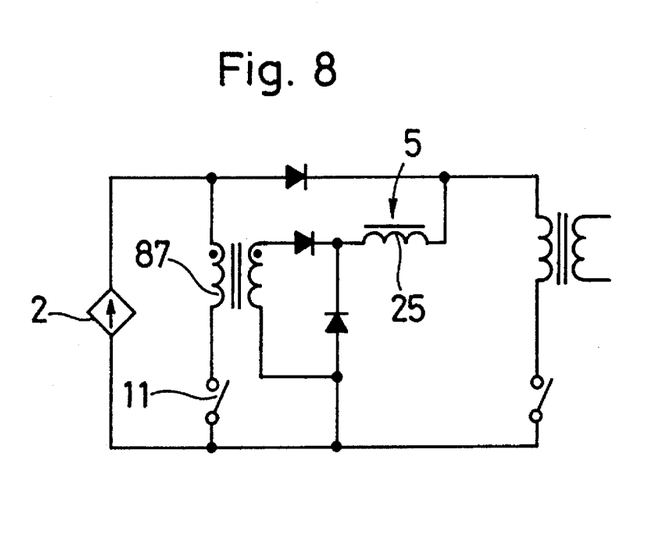
FIG. 8 is a circuit diagram in accordance with another embodiment of the invention.
Figure 9:
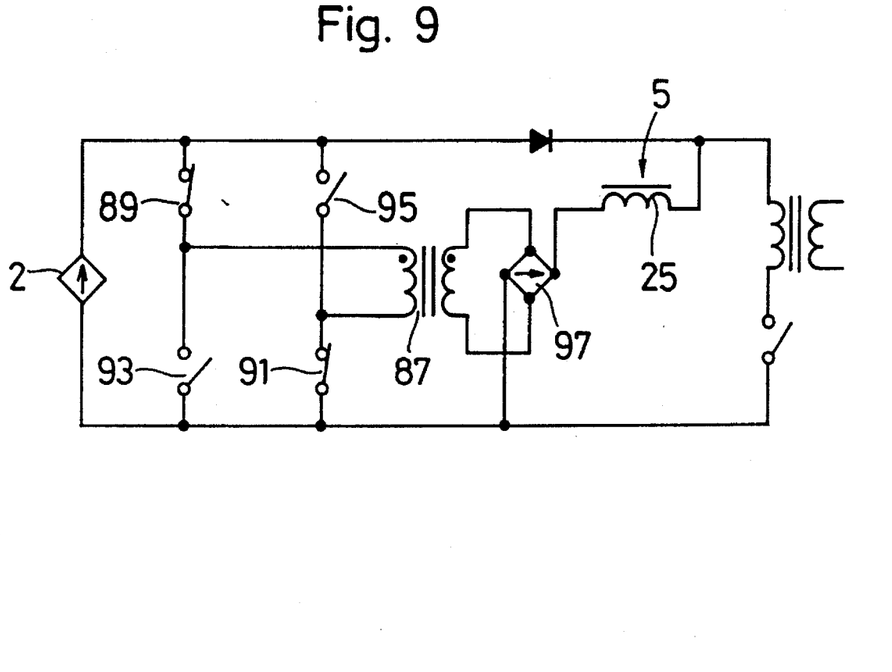
FIG. 9 is a circuit diagram in accordance with still another embodiment of the invention.

The switching system of the first switching element 11 in the present invention executed by a method shown in FIGS. 8 and 9, becomes is more advantageous for a large output signal. FIG. 8 shows a circuit in which a step-up insulating transformer 87 is provided between the rectifier circuit 2 and the step-up circuit 5. Such a construction enables the capacitance of the switching element 11 to be more reduced since the current flowing through the switching element 11 flows at the primary side of the step-up insulating transformer 87. As a result, this system enables the capacitance to be relatively larger than that of the flyback system.

Subsequently, a circuit shown in FIG. 9 also provides a step-up insulating transformer 87. In the circuit, two-directional current flows by use of the backup insulating transformer 87 as well as four switches 89, 91, 93 and 95, to thereby enhance the use efficiency of the step-up insulating transformer 87. Hence, because a.c. current flows at the secondary side of the step-up insulating transformer 87, it is rectified by the rectifier circuit 97 at the fore-stage of the inductor 25. In the above-mentioned constructions, the circuit shown in FIG. 8 is suitable for an intermediate capacitance and that shown in FIG. 9 is for a large capacitance.

As was described above, the present invention can obtain the following excellent advantages. When the full-wave rectified waveform in the form of the sine wave is directly switched at the primary side of the high-frequency transformer and the high-frequency pulse, which is modulated in the form of the reverse sine wave, is outputted at the secondary side, the self-induction electromotive force produced by the inductor is superimposed on the input voltage by the step-up circuit provided at the primary side. Therefore, a voltage in the low voltage region of the a.c. input voltage is raised, thereby remarkably improving the power factor. Then, the frequency of the switching operation conducted by the switching element is extremely high, and the high-frequency pulse obtained by the switching operation is applied to the output smoothing capacitor through the secondary-side choke coil. Hence, the power factor is improved, a reactive current is reduced, and the choke coil and the smoothing capacitor can be downsized.

There is no input smoothing capacitor of a large capacitance for smoothing the low-frequency current at the primary side. The secondary-side output smoothing capacitor smoothes the high-frequency pulse and a ripple current is remarkably reduced by the step-up circuit provided at the input side. In addition, the capacitance is remarkably reduced in comparison with the sum of capacitances of both the input smoothing capacitor and the output smoothing capacitor of the conventional one, thereby being capable of largely contributing for downsizing of the device and lowering of the costs.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A switching regulator comprising:

a primary-side circuit including a rectifier circuit without a smoothing circuit for applying a high-frequency pulse input voltage to a primary side of a high-frequency transformer;

a secondary-side circuit including a rectifier circuit and a smoothing circuit at a secondary side of said high-frequency transformer;

a superimposing chopping-wave voltage forming circuit for forming a chopping-wave voltage or a saw-tooth-wave voltage in synchronism with a pulse frequency of said primary-side circuit and superimposing a secondary-side d.c. output detecting voltage on the chopping-wave voltage or the saw-tooth-wave voltage;

a control circuit which outputs a pulse signal when the superimposed chopping-wave voltage or the saw-tooth-wave voltage formed by said superimposing chopping-wave voltage forming circuit exceeds a reference voltage and lowers a clock pulse in level by use of a latch characteristic on the basis of the outputted pulse signal and hold the clock pulse till a rising of a succeeding clock pulse to output the clock pulse to said primary-side circuit as a switching pulse signal; and a step-up circuit having a bypass line and an inductor arranged in parallel to each other between said rectifier circuit and said high-frequency transformer in said primary-side circuit.

2. A switching regulator as claimed in claim 1, further comprising a switching circuit for controlling a current flowing in said inductor according to an input voltage waveform.

* * * * *